Jan. 27, 1948.  W. S. HOOVER  2,435,080
HELICOPTER ROTOR CONTROL
Filed Jan. 5, 1945  4 Sheets-Sheet 1

INVENTOR
Walter S. Hoover
BY William B. Jaspert
ATTORNEY

Jan. 27, 1948.  W. S. HOOVER  2,435,080
HELICOPTER ROTOR CONTROL
Filed Jan. 5, 1945  4 Sheets-Sheet 3

INVENTOR
Walter S. Hoover
BY
William B. Jaspert
ATTORNEY

Patented Jan. 27, 1948

2,435,080

UNITED STATES PATENT OFFICE 2,435,080

HELICOPTER ROTOR CONTROL

Walter S. Hoover, South Newfane, Vt.

Application January 5, 1945, Serial No. 571,439

9 Claims. (Cl. 244—17)

1

This invention relates to new and useful improvements in helicopters, more particularly to a rotor system therefor with automatic and semiautomatic hydraulic controls for feathering and tilting the rotor wings or blades to obtain the desired lifting and sidewise propulsion thrust of the blades.

It is a further object of the invention to provide a rotor system for helicopters embodying two sets of oppositely rotating wings or blades in which the blades of both sets of rotors are coordinated in their pitch and thrust adjusting movements.

Still a further object of the invention is the provision of a feathering rotor system in which the rotor wings are mounted on antifriction bearings and pivotally connected to be angularly movable about their axis by means of hydraulic operated cams, and in which the cams of said oppositely rotating rotor system are coordinated in their function by hydromatic controls which may be manually operated and/or which are operated in response to variations in the engine speed and/or the external wind velocity.

Another object of the invention is the provision of a manual and/or automatic or semi-automatic hydraulic control and actuating system for a pair of oppositely rotating wings for helicopters employing slave valves that coordinate the application of actuating pressure fluids for pitch and thrust adjustment of both wings and which control the pitch of the rotor wings to maintain constant engine speed.

Still another object of the invention is the provision of a rotor system of the above-designated character which is constructed as a unit that is readily attachable to the fuselage of the aircraft and in which the operating parts are of strong and durable mechanical construction yet of relatively light weight.

Figure 1:
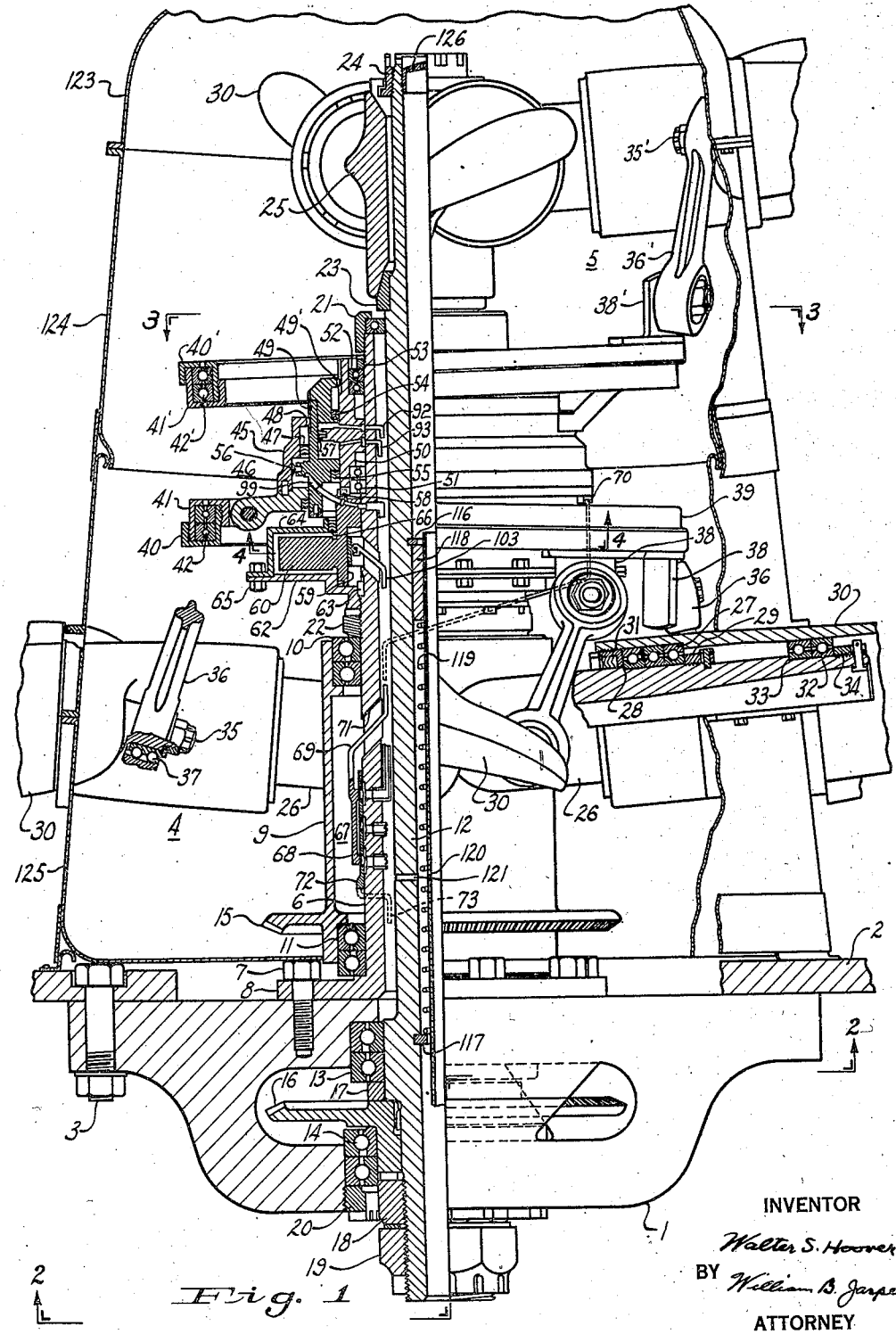
Figure 2:
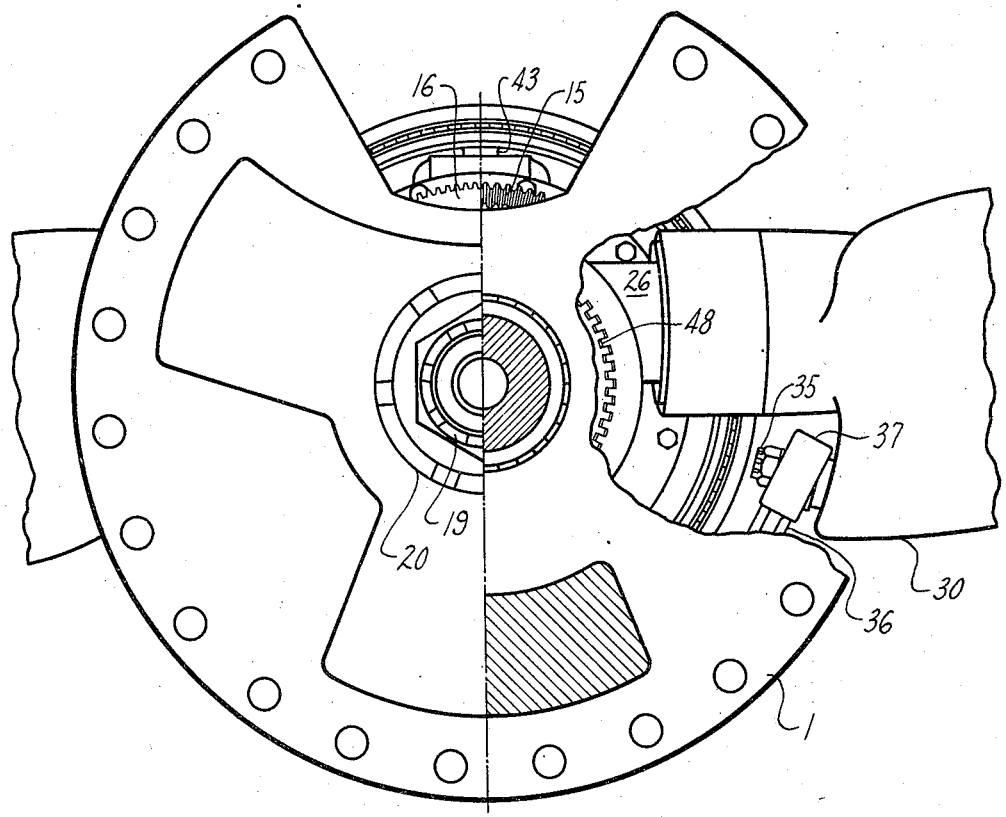
Figure 3:
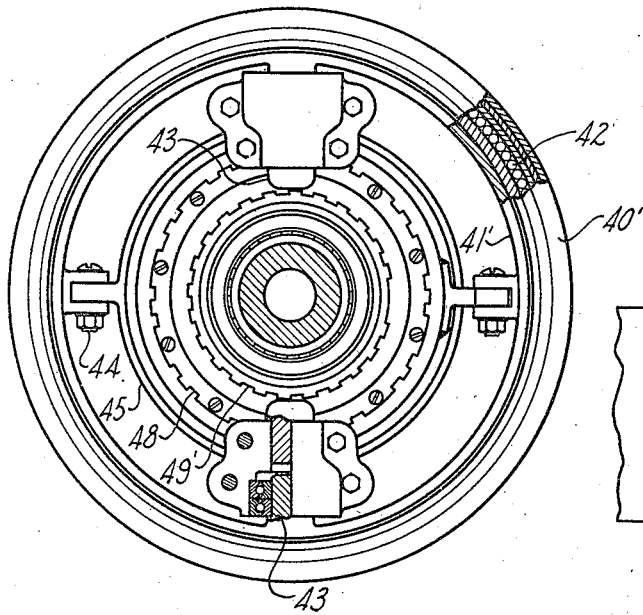
Figure 4:
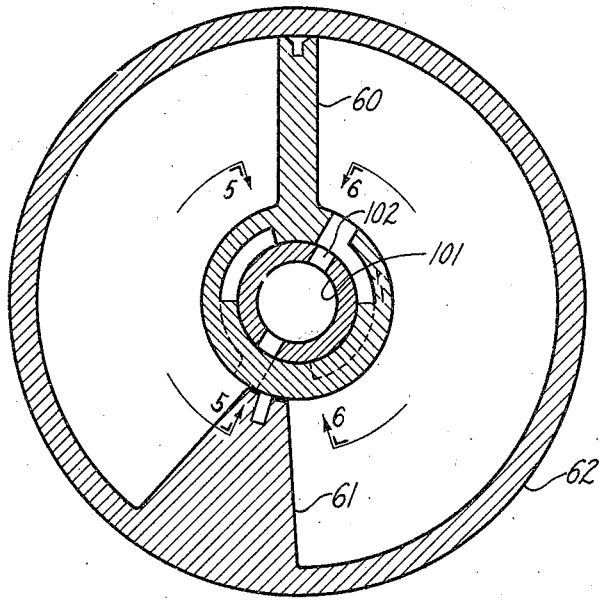

These and other objects of the invention will become more apparent from a consideration of the accompanying drawings constituting a part hereof, in which like reference characters designate like parts, and in which Fig. 1 is a vertical cross-sectional view partially in elevation of a feathering rotor system for helicopters with the blades partially broken away, embodying the principles of this invention;

Fig. 2 a bottom plan view, partially in section, taken along the line 2—2 of Fig. 1;

Fig. 3 a cross sectional view, partially in elevation, of the rotor shaft and cam taken along the line 3—3 of Fig. 1;

Fig. 4 a cross sectional view of the vane rotor

Figure 5:
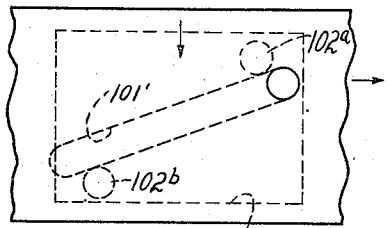
Figure 6:
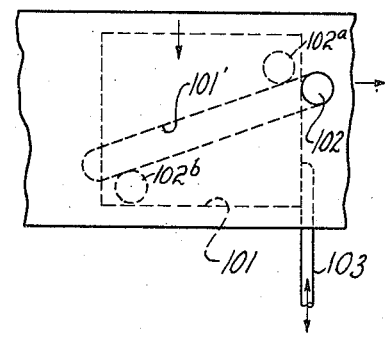
Figures 7, 8:
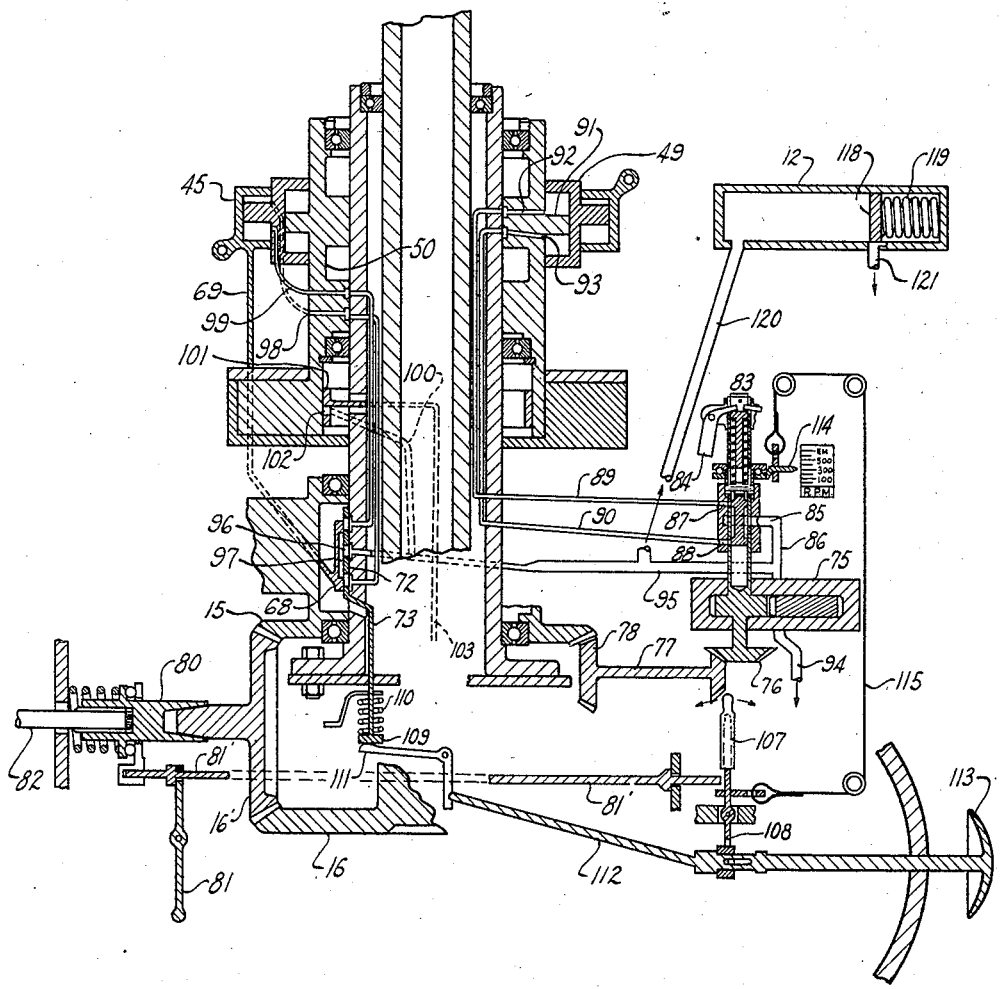

2 and valve for controlling the application of pressure fluid;

Figs. 5 and 6 diagrammatic views of the valve of Fig. 4 taken along the lines 5—5 and 6—6 of Fig. 4, Fig. 7 a front elevational view of the levers 107 and 108 and a portion of the connecting linkage taken transversely of the showing of levers 107 and 108 in Fig. 3 of the drawings; and Fig. 8 a diagrammatic view showing the manual, governor and velocity control for routing the pressure fluid to the operating parts in the propulsion movements of the aircraft.

With reference to Fig. 1 of the drawing, the structure therein illustrated comprises a solid steel forging frame designated by the reference numeral 1 which supports the entire rotor assembly. The frame 1 is secured to the fuselage 2 by clamping bolts 3 to provide a very solid mounting which will resist all movements, stresses and vibrations produced by the oppositely rotating rotor mechanisms which may be generally designated by the numerals 4 and 5. A hollow cylinder or column 6 is clamped to the base frame 1 by bolts 7 extending through a flange 8 which seats on the frame 1, the column 6 comprising the support for the rotor 4 which is mounted on a hollow shaft or hub 9 journaled on antifriction bearings 10 and 11 to the hollow column 6. A hollow shaft or spindle 12 extending beyond the column 6 constitutes the drive shaft for the rotor 5. It is journaled by antifriction bearings 13 and 14 in the base frame 1. The drive shaft 9 for the rotor 4 and the spindle 12 for the rotor 5 are provided with beveled gears 15 and 16 which coact with the teeth of a beveled gear 16', Fig. 8, driven by the engine shaft, the rotation of which subjects the spindle 9 of rotor 4 and spindle 12 of rotor 5 to rotation in opposite directions.

The bearings 13 of spindle 12 carry the lift thrust through ring 17 to the frame 1, the thrust of the rotor 5 being transmitted to the frame 1 through nuts 18 and 19, and the two bearings 14 are preloaded by the retention nut 20. The spindle 12 of the rotor 5 is additionally supported by bearing 21 at its upper end and the lateral forces are transmitted to the base frame 1 through the fixed column 6.

In the mounting of the rotor 4 bearings 11 are preloaded by retention nut 22 which supports the lift thrust through the radial thrust bearings 10. The conventional cone construction 23 and 23a loaded by the retention nut 24 is used to locate the rotor hub 25 of rotor 5 to the drive spindle 12.

The hub or sleeve 9 is a spider having four integral arms 26 mounted eccentrically with the center line of the arm lying substantially at mid-distance in the normal radial line between the longitudinal axis of the hub and the extreme point of this radial line in the periphery of the hub. The center line of the arm 26 as viewed in Fig. 1 forms a dihedral angle in relation to a plane perpendicular to the axis of the drive shafts. Each arm is provided with a group of three bearings 27 pressed against a shoulder 28 by a retention nut 29. A wing or blade 30 is assembled on the bearings 29 and secured by a retention nut 31 which at the same time preloads bearings 27. Bearings 32, mounted against shoulder 33 of the arms 26, are held by retention nuts 34 and constitute a part of the blade support. Very close fits are provided between the blade root and the bearings 27 and 32, and each blade is free to revolve on its bearings 27 and 32 for pitch adjusting or feathering movement, which is effected by the following mechanism.

At the trailing side of each blade is a pivot pin 35 extending substantially parallel with the center line of the blade, the pin being joined by a connecting rod 36 having antifriction bearings 37 mounted in an arcuate race 37a to allow a certain degree of universal movement of the connecting rod 36 on the pivot 35. The other end of connecting rod 36, having a similar bearing 37, is connected to a hanger 38 depending from the cam 39. The position of the hanger controls the angle of incidence of the blade pitch which is automatically adjusted in response to a rocking movement of the cam 39 which consists of two sections 40 and 41 having bearings 42 therebetween. There are four hangers 38 on each cam welded thereto at 90° for connection through the rods 36 with the four rotor blades 30. As shown in Fig. 3, the cams are mounted to tilt around the axis of trunnions 43 and are pivotally connected by lugs 44 and 44' of cams 41, 41' to a piston 45 of a hydraulic control system generally designated by the numerals 46. The piston 45 is provided with a liquid seal 47 and is keyed by a spline 48 to an inner piston 49 which, in turn, is keyed by a spline 49' to a cylinder 50 which is journaled on the column 6 by bearings 51 and 52 and positioned by a retention nut 53. The trunnions 43 are fixed to piston 49 to move the cams bodily axially of the rotor shaft. Liquid seals 54 and 55 are provided for the piston 49 which is further provided with sealer rings 56 and 57.

The bottom of the cylinder 50 has a spline connection 58 with a hydraulic rotor 59 which, as shown in Fig. 4, consists of a vane rotor 60 and an abutment 61 formed integral with the retainer plate 62, the retainer plate being secured to the column 6 and keyed at 63 to be fixed to the column. The rotor is housed by a cover 64 secured by bolts 65 and a packing 66 prevents leakage of high pressure fluid. When the hydraulic actuator 60 is rotated by pressure fluid, the rotation is transmitted to the cylinder 50 through the spline connection 58 which rotates the cams 40 and 41, the cams being connected to piston 49 by the trunnions 43 as shown in Fig. 3. Cylinder 50 is spline connected to piston 49 at 49'. The cams are further subjected to tilting movement by sliding movement of the piston 45 and movement of piston 49 subjects both cams to longitudinal movement on the rotor axis, both cams preserving their same relative position. The piston 49 is adapted to reverse the blade pitch in case of engine failure. The portion 41 of the cams is driven by the rotors by virtue of their connections through the rods 36. The cam connecting rod and blade parts of the upper rotor 5 have been designated as prime numbers of the same characters as employed on similar parts for the rotor 4.

The hydraulic mechanism is controlled by a valve system, generally designated by the numeral 67, which is located inside the hub or hollow shaft 9 of rotor 4 and consists of a valve 68 connected by a rod 69 to the piston 45 at 70, the rod 69 passing through a slot 71 and a similar slot (not shown) on the opposite side of the rigid column 6. Valve 68 is thus responsive to movement of the cam tilting piston 45. Because of this coordinate movement, valve 68 may be termed a slave valve. A second valve 72 is disposed within the valve 68 and is controlled through a rod 73, Fig. 8 of the drawings, in response to forward speed of the aircraft, as will be hereinafter explained.

The connections of the hydraulic system with the source of pressure fluid and controls is more clearly shown in the diagrammatic view of Fig. 8 of the drawings in which the numeral 75 designates a gear pump driven by a beveled gear 76 from a take-off shaft 77 that has a gear wheel 78 interacting with the teeth of the gear wheel 15. Also, as shown in Fig. 8, gear wheels 15 and 16 mesh with a drive gear 16' having engagement with the clutch 80 that is operated by a lever 81 and rod 81', the clutch 80 being driven by the engine shaft 82. Gear wheel 76 also drives a governor generally designated by the numeral 83 having flyweights 84 for operating a pressure balanced valve 85 having a gland 86 connected to the pump 75 and having glands 87 and 88 connected by conduits 89 and 90, respectively, to the opposite sides of the abutment 91 through glands 92 and 93 for operating the piston 49. The numeral 94 designates a connection to the sump which is the source of the fluid delivered to pump 75, the high pressure side 86 of which is further connected by a conduit 95 to the port 96 of valve 72 to always maintain high pressure fluid in the chamber 97 of the valve 68.

Movement of valve 68 connects the high pressure fluid from chamber 97 through glands 98 and 99 to the cam tilting piston 45 to actuate the same, and a gland 100 connects the high pressure fluid from the pump to a valve 101 having a port 102 by which the fluid is applied to the vane rotor 60 to effect angular displacement of the sleeve 50 and cams 40 and 40' which is diagrammatically shown in Fig. 8.

As shown in Figs. 4, 5 and 6, valve 101 is provided with an inclined passage 101' which registers with the port 102 for delivering high pressure fluid from gland 100 to the rotor vane 60. When the vane 60 rotates the fluid is trapped in both high pressure and drain ports 102a and 102b to lock the vane in its adjusted position until control rod 103 is again moved. Valve 101 does not rotate but is movable vertically by the control rod 103. The vertical plane of the rotor vane abutment 61 is off-set to allow vane 60 to turn 180° for a backward translation of the helicopter in one direction and 160° in the other direction. By sliding the valve 101 up or down the helicopter is turned as desired.

Valve 101 is operated by a linkage 103 connected to lever 104 pivoted at 105 and having a slotted connection with a pin 106 to be operated by a lever 107 which may be termed the control stick, which is movable on a cylindrical seat of lever 108 for movement in two directions, and by transverse movement of lever 107, lever 108 is movable in two other directions to actuate the linkage 81' and 112, Fig. 8.

As shown in Fig. 8, rod 73, which actuates valve 72, is provided with an abutment 109 and is biased by a coil spring 110. Abutment 109 rests on an arm of a lever 111 which is actuated by a rod 112 which is provided with a pressure plate 113 that extends externally of the aircraft to be sensitive to the wind velocity to which it is exposed, all for a purpose to be hereinafter stated. The governor valve 85 may be preset by adjustment of indicator 114, Fig. 8, to any desired speed as shown, the adjustment being effected through a rope and pulley connection 115 with the stick 107 which is shown in Figs. 7 and 8.

Referring to Fig. 1 of the drawings, a fluid pressure accumulator is provided in the hollow shaft 12 and consists of a chamber constituted by the hollow interior of the shaft 12, the end rings 116 and 117, a piston 118 and a coil spring 119. A conduit 120 is the high pressure fluid line from pump 75 which supplies the accumulator. A vent 121 is drilled through the shaft 12 to limit the accumulator to store pressure fluid to the point where the piston 118 will drop below the vent 121. The purpose of the accumulator, which is connected to the high pressure line 95 as shown diagrammatically in Fig. 8, is to store sufficient power to respond to any sudden demand as, for example, when backward movement of the craft is required.

As shown in Fig. 1, the entire power system of the rotor is enclosed in a sectional sheet metal cover such as pressed aluminum designated by the numerals 123, 124 and 125, each section being driven by its respective rotor. By this arrangement it is possible to lubricate by a sprayed jet, the lubricating fluid under pressure being sprayed through the perforated plate 126 at the top of the hollow shaft 12, the oil, dropping by gravity, meeting all the moving parts, bearings, etc., in its passage before reaching the sump.

The operation of the above-described helicopter rotor is briefly as follows:

The operator starts the engine and then engages clutch 80 with the drive gear 16' by throwing lever 81. The rotary speed controller 114 is then set to the desired R. P. M. which is indicated at 300 in Fig. 8 of the drawing. The control stick 107 is maintained in neutral position with cams 40 and 40' in non-tilting position and the operator then actuates the engine throttle and waits until the lift of the rotors overcomes the weight of the craft. The throttle is the only control needed for this operation to give the desired rate of vertical climb, the rate of which is selected by operation of the throttle. When it is desired to hover at any altitude the rotor blades are adjusted to a pitch at which the lift is equal to the total weight of the craft. This may be done by varying the throttle setting or by adjusting the R. P. M. indicator 114 or both. If it is desired to move backwards from the hovering position or sidewise, the control stick 107 is moved to the extreme position corresponding to the direction of backward movement of the craft. Due to the fact that the hovering lift must be preserved while creating the additional side thrust, the operator will have to maneuver the throttle to hold the constant altitude. When the control stick 107 is tilted for side thrust, the rod 112 will operate lever 111 which actuates the valve 72 and directs high pressure fluid to the piston 45 which tilts the cams 40 and 40', resulting in a cyclic pitch setting which produces the thrust. In other words, the tilted cam will effect a variation of the pitch of the blade through 360° of its rotation to produce a desired thrust in a given direction forward, reverse or sidewise.

When the craft has been maneuvered to the position for forward speed, the device is turned over to automatic controls by moving the control stick 107 to its neutral position. The only control then exercized by the operator is the throttle to maintain altitude. When it is desired to turn left or right during forward speed, the control stick 107 is moved to the desired angle and the thrust will then be directly parallel to the rotor vane 60. Being in forward speed, the fuselage, due to aerodynamic forces on the side surfaces of the helicopter, will take the direction of thrust and the control stick 107 will have to be readjusted just before a new direction is obtained. As noted from the side view of the control stick 107 in Fig. 7, there is a certain freedom of movement of the stick due to the slotted connection 106 during which the vane rotor valve is not actuated. When lever 107 has been moved to the extreme position of its engagement with the slot 106, rod 103 of the rotor valve 101 will be actuated to raise or lower the valve 101 to admit high pressure fluid to the rotor vane, whereby the entire cam mechanism is subjected to angular motion without disturbing the tilted position of the cams. In this manner the thrust for which the cams are set is maintained while pitch variation for speed and maneuverability is exercized through the stick control. The constant speed of the engine is maintained by the governor valve 85 which directs pressure fluid to piston 49 to raise or lower the trunnions 43 which increase or decrease the pitch of the blades to restore the engine speed. Forward speed of the craft may be controlled by the external wind velocity acting on pressure plate 113 which operates valve 72 to actuate piston 45 to vary the forward thrust of the blades by changing the tilt of the cams.

Valve 68 functions to restore the position of the cams by its connection to piston 45 since valve 68 is movable with the piston.

Since the accumulator chamber in the spindle 12 is connected to the high pressure source of pump 75 as diagrammatically shown in Fig. 8, it will build up pressure fluid to the point where the piston 118 exposes the vent 120 and this pressure fluid storage is available to take care of any sudden demand of the hydromatic controls.

In case of engine failure, the control stick is pushed forward to its full extent, which pushes rod 81' forward and disengages clutch 80 thereby disconnecting the rotor from the engine. This movement also unloads spring 110 permitting the valve 72 to drop to redress the cams and equalize pitch. The cable 115 of the speed adjuster 114 is simultaneously moved to the emergency point at the top of the scale in Fig. 8 which corresponds to zero or negative pitch of the blades.

The rotor, due to downward motion of the craft, will start to windmill in the same direction of rotation as before and when a desired speed of rotation is attained the control stick 107 is released and the speed selector 114 is set to a desired constant speed. The booster pump 75 will continue to operate through the gears 78 and 76 and the oil pressure is maintained and built up in the accumulator. When the momentum of the craft in forward speed is exhausted it is susceptible to fall vertically. By operating control stick 107 the rotors may be controlled to thrust and pitch setting through the oil pressure system to maneuver the craft in any direction.

The rotor wings or blades are given a fixed dihedral angle for stability in flight. The blade pitch axis is offset with respect to the vertical rotor axis so that the centrifugal twisting moment of the rotor wings is balanced out by centrifugal force for the purpose of eliminating the rotor wings centrifugal twisting moment to minimize the cyclic pitch change load on cams 40, 40' on the bearings, the connecting rods and hydraulic actuators for changing cyclic and constant speed pitch. The connecting rods 36, as appears from Fig. 1 of the drawings, are mounted on the extreme trailing edge of the wings or blades 30 to obtain aerodynamic pitch load aid. The governor valve 83 and the forward velocity pressure plate 113 function automatically to proportion the lift and thrust pitch in forward speed. Thus in take-off, all horsepower on the straight lift is under constant speed governor control, and upon reaching the desired altitude, the pressure plate 113, which is connected to the control stick 107, is manually controlled to give forward thrust which requires less horsepower for the lift while maintaining the same altitude.

All stresses resulting from forward speed and inflow velocities are balanced out from the rotor support 6 and fuselage by the proportional control of pressure plate 113 of the cyclic pitch. In forward movement of the aircraft the blade or wing advancing into the inflow velocity is subjected to a lessening pitch, and in the retreating portion of the cycle the blade adjusts to maximum forward pitch to maintain uniform thrust of the blade during its complete cycle of rotation.

Although one embodiment of the invention has been herein illustrated and described, it will be evident to those skilled in the art that various modifications may be made in the details of construction without departing from the principles herein set forth.

I claim:

1. In a helicopter, a rotary wing mounted for angular movement about its own axis and for rotation on a vertical rotor axis, a driving engine for said rotary wing, a rotary cam adapted for transverse movement on said rotor axis and for tilting movement transversely of said rotor axis, a rod connecting the rotary wing and cam to vary the pitch of said wing in accordance with the axial and tilting position of said cam, hydraulic actuating means for varying the tilt of the cam during rotary movement of said wing, and hydraulic actuating means for varying the axial position of said cam during rotation of said wing, a manual control for directing pressure fluid to said first-named means and means operative in response to the forward velocity of the aircraft for controlling said first-named actuating means independently of said manual control and a governor valve controlling said second-named means in response to variations in the engine speed.

2. In a helicopter, a stationary cylindrical column for mounting on a fuselage including a base for said column, a spindle journaled in said base extending through said column, an engine for said spindle, a hydraulic displacement unit embodying a rotary vane having one of its relatively movable parts secured to said column and having its other relatively movable part journaled on said column, a rotary wing mounted on said spindle adapted for angular movement on its own axis to vary the pitch thereof, a circular cam concentric with said column and spindle and mounted on the movable element of said hydraulic displacement unit and being further mounted for tilting on an axis transversely of said column, a rod connecting said cam and rotary wing to subject said wing to pitch changing movement, means for subjecting the cam to movement axially of said column and to tilting movement to vary the normal and cyclic pitch of the rotary wing to maintain constant speed of said wing, and pressure fluid means for said rotary vane to effect relative displacement of said rotary wing drive and column to thereby vary the relative angular position of said cam and rotary wing to direct the forward thrust of said wing.

3. In a helicopter, a stationary cylindrical column for mounting on a fuselage including a base for said column, a spindle journaled in said base extending through said column, an engine for said spindle, a hydraulic displacement unit embodying a rotary vane having one of its relatively movable parts secured to said column and having its other relatively movable part journaled on said column, a rotary wing mounted on said spindle adapted for angular movement on its own axis to vary the pitch thereof, a circular cam mounted for rotary movement concentric with said column and spindle on the movable part of said hydraulic displacement unit, a rod connecting said cam and rotary wing to subject said wing to pitch changing movement, means for tilting said cam comprising a hydraulic piston journaled on said column, a source of pressure fluid for said piston, valve mechanism controlling the application of said pressure fluid including a follow-up valve attached to said piston, said first-named valve being manually operable to tilt said cam to vary the cyclic pitch of said rotary wing, and said follow-up valve being adapted to restore said cam to its required operation, and means for energizing said hydraulic displacement unit to effect angular displacement of the cam relative to the rotary wing.

4. In a helicopter drive, a base member secured to the fuselage, a stationary column extending from said base, a spindle journaled in said base extending through said column, a rotary wing mounted at the extended end of said spindle above said column, a hub journaled on said column, a rotary wing mounted on said hub, a pair of cams mounted concentric with said column adapted for rotary movement, a rod connecting one of said cams to the upper rotary wing and a rod connecting the other of said cams to the lower rotary wing, hydraulic piston mechanism for tilting said cams and hydraulic piston mechanism for subjecting said cams to axial displacement relative to said rotary wings whereby to respectively vary the cyclic pitch and thrust of said rotary wing, a source of pressure fluid for said pistons, valve mechanism controlling the application of said pressure fluid, a pressure fluid accumulator connection to said valve mechanism and to said pressure fluid source, means for actuating said valve, and means responsive to movement of said cam tilting piston for restoring said valve, and a governor valve controlling the application of pressure fluid to said pitch setting piston to maintain constant speed of the propelling engine.

5. In a helicopter drive, a rotor wing, a driving engine therefor, means for regulating the cyclic pitch of said wing to thereby vary the propulsion thrust in a lateral plane, hydraulic actuating mechanism for said cyclic pitch adjusting means and hydraulic actuating means for adjusting the pitch of the rotor wing independently of said cyclic pitch adjusting means, a source of pressure fluid, an accumulator connected to said pressure source and having connections with said cyclic pitch and independent pitch adjusting means, and means actuated by the rotor wing drive independently of the driving engine for delivering pressure fluid from the source to said accumulator to thereby render said cyclic pitch and independent pitch adjusting means operable independently of the driving engine.

6. In a helicopter drive, a base member for mounting to the fuselage, a cylindrical column extending from said base and rigidly connected thereto, a hollow spindle journaled in said base extending through said column, and a hollow spindle journaled on said column extending externally of said column from said base, an engine for driving, rotor wings mounted on said drive spindles, cam mechanism rotatably mounted concentric of said spindles, rods connecting said cams and rotor wings, hydraulic actuated means for tilting said cams and independent hydraulic actuated means for displacing said cams vertically relative to said rotor wing hubs, a source of pressure fluid for said last-named hydraulic actuating means including a governor valve responsive to variations in the speed of the drive engine to regulate the pitch of the rotor wings to maintain constant speed of said engine, an accumulator connected to said pressure source for accumulating a reserve of pressure fluid to render said rotor wing pitch adjusting means operative independently of the drive engine and a rotor vane connected to said pressure source and accumulator to render the rotor wing drive mechanism angularly movable relative to the fuselage, and control mechanism for said rotor vane comprising a lever manually operable for directing the application of pressure fluid thereto, control means for said pitch adjusting means comprising a valve operable in response to the external wind velocity and having connections with said control lever to be operable thereby, said valve mechanism including a slave valve for restoring the hydraulic actuating means to its required operation.

7. In a rotary wing drive for helicopters, means for continually varying the thrust of the rotor wing during 360° of rotation including rotary cam mechanism having connection with the rotary wing to subject the latter to angular pitch setting movement about its own axis, means for tilting the cam to the desired cyclic pitch setting and means for moving the cam relative to the wing axis to vary the pitch of the wing to thereby vary the propulsion thrust independently of the cyclic pitch setting, hydraulic actuated means for effecting said cam adjustments including a governor valve responsive to variations in the rotor wing drive to control the thrust pitch setting, manual means regulating the hydraulic actuator for cyclic pitch adjustment and means responsive to the external wind velocity for regulating said cyclic pitch adjustment, said manual means comprising a lever connected to said wind velocity control means to adjust the cyclic pitch mechanism independently of said wing velocity control means, and said lever being operative to disconnect the rotor wing drive from the prime mover.

8. In a rotary wing drive for helicopters, means for continually varying the thrust of the rotor wing during 360° of rotation including rotary cam mechanism having connection with the rotary wing to subject the latter to angular pitch setting movement about its own axis, means for tilting the cam to the desired cyclic pitch setting and means for moving the cam relative to the wing axis to vary the pitch of the wing to thereby vary the propulsion thrust independently of the cyclic pitch setting, hydraulic actuated means for effecting said cam adjustments including a governor valve responsive to variations in the rotor wing drive to control the thrust pitch setting, manual means regulating the hydraulic actuator for cyclic pitch adjustment and means responsive to the external wind velocity for regulating said cyclic pitch adjustment, said manual means comprising a lever connected to said wind velocity control means to adjust the cyclic pitch mechanism independently of said wind velocity control means, said lever being operative to disconnect the rotor wing drive from the prime mover, said hydraulic control system embodying an accumulator for storing pressure fluid directly connected to said cyclic pitch and through the governor valve to said thrust pitch adjusting means to maintain pressure fluid available for pitch adjustment independently of the pressure fluid source, said pressure fluid accumulating means being operative independently of the prime mover.

9. In a helicopter, a rotary wing mounted for pitch adjusting movement about its own axis on a hub, a drive engine therefor, means connecting said engine to said hub, means for varying the pitch of said wing including a first fluid pressure means for varying the mean pitch, a second fluid pressure means for varying the cyclic pitch, means for actuating said first and second fluid pressure means, means for storing fluid pressure, means connecting said fluid pressure storing means to said first and second fluid pressure means and to said actuating means, and means connecting said actuating means to said hub so constructed and arranged as to enable said actuating means to be driven by said rotary wing independently of said engine when said engine is disconnected from said wing.

WALTER S. HOOVER.

REFERENCES CITED

The following references are of record in the file of this patent:

UNITED STATES PATENTS

| Number | Name | Date |
|---|---|---|
| 1,919,089 | Breguet | July 18, 1933 |
| 1,921,805 | Bordoni | Aug. 8, 1933 |
| 2,209,879 | Focke | July 30, 1940 |
| 2,317,340 | Bennett | Apr. 27, 1943 |